United States Patent
Zhang et al.

(10) Patent No.: US 10,032,076 B2
(45) Date of Patent: Jul. 24, 2018

(54) METHOD AND DEVICE FOR DISPLAYING IMAGE

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/210,682

(22) Filed: Jul. 14, 2016

(65) Prior Publication Data

US 2017/0032185 A1 Feb. 2, 2017

(30) Foreign Application Priority Data

Jul. 28, 2015 (CN) .......................... 2015 1 0452003

(51) Int. Cl.
| | |
|---|---|
| *G06K 9/36* | (2006.01) |
| *G06K 9/00* | (2006.01) |
| *G06K 9/03* | (2006.01) |
| *G06K 9/46* | (2006.01) |
| *H04N 1/40* | (2006.01) |

(52) U.S. Cl.
CPC ..... *G06K 9/00624* (2013.01); *G06K 9/00281* (2013.01); *G06K 9/00677* (2013.01); *G06K 9/036* (2013.01); *G06K 9/4661* (2013.01); *H04N 1/40012* (2013.01)

(58) Field of Classification Search
None
See application file for complete search history.

(56) References Cited

U.S. PATENT DOCUMENTS

| | | | | |
|---|---|---|---|---|
| 8,379,939 | B1* | 2/2013 | Bourdev | G06K 9/00677 382/118 |
| 8,693,789 | B1* | 4/2014 | Seitz | G06K 9/00308 382/209 |
| 8,724,910 | B1* | 5/2014 | Pillai | G06K 9/00288 382/225 |
| 2008/0089561 | A1 | 4/2008 | Zhang | |
| 2008/0089590 | A1 | 4/2008 | Isomura et al. | |
| 2010/0235400 | A1 | 9/2010 | Myers et al. | |
| 2011/0007975 | A1 | 1/2011 | Kazama et al. | |

(Continued)

FOREIGN PATENT DOCUMENTS

| | | |
|---|---|---|
| CN | 101523412 A | 9/2009 |
| CN | 101777059 A | 7/2010 |

(Continued)

OTHER PUBLICATIONS

International Search Report of International Application No. PCT/CN2015/097782, dated May 4, 2016, issued by the State Intellectual Property Office of P.R. China as the ISA (5 pages).
English version of the International Search Report of PCT/CN2015/097782, mailed from the State Intellectual Property Office of China dated May 4, 2016.

(Continued)

*Primary Examiner* — Brian Werner
(74) *Attorney, Agent, or Firm* — Finnegan, Henderoth, Farabow, Garrett & Dunner LLP

(57) ABSTRACT

A method for displaying images includes clustering similar images in an album into a plurality of image groups when receiving an instruction for opening the album, selecting representative images from the image groups, and displaying the representative images.

16 Claims, 10 Drawing Sheets

(56) References Cited

U.S. PATENT DOCUMENTS

| | | | |
|---|---|---|---|
| 2012/0082378 A1* | 4/2012 | Peters | G06F 17/30265 382/165 |
| 2013/0070975 A1* | 3/2013 | Begeja | G06K 9/00295 382/118 |
| 2013/0100334 A1* | 4/2013 | Blayvas | G06F 3/042 348/345 |
| 2013/0236072 A1* | 9/2013 | Sun | G06K 9/00248 382/118 |
| 2014/0226877 A1* | 8/2014 | Je | G06K 9/00288 382/118 |
| 2014/0301653 A1* | 10/2014 | Murphy-Chutorian | G06K 9/00221 382/224 |
| 2015/0071557 A1 | 3/2015 | Movellan et al. | |
| 2016/0321831 A1* | 11/2016 | Nakamura | G06T 11/60 |
| 2017/0084068 A1* | 3/2017 | Son | G06T 11/60 |

FOREIGN PATENT DOCUMENTS

| | | |
|---|---|---|
| CN | 103064963 A | 4/2013 |
| CN | 103955481 A | 7/2014 |
| CN | 105138962 A | 12/2015 |
| EP | 2312462 A1 | 4/2011 |
| JP | 2006-295890 A | 10/2006 |
| JP | 2008-276668 A | 11/2008 |
| JP | 2010-118943 A | 5/2010 |
| JP | 2010-153936 A | 7/2010 |
| WO | WO 2015/167975 A1 | 11/2015 |

OTHER PUBLICATIONS

Extended European Search Report of European Patent Application No. 16181425.6, from the European Patent Office, dated Feb. 8, 2017.

* cited by examiner

METHOD AND DEVICE FOR DISPLAYING IMAGE

CROSS-REFERENCE TO RELATED APPLICATIONS

The present application is based upon and claims priority to Chinese Patent Application No. 201510452003.3 filed Jul. 28, 2015, the entire contents of which are incorporated herein by reference.

TECHNICAL FIELD

The present disclosure relates to terminal technology and, more particularly, to a method and device for displaying images.

BACKGROUND

With the rapid development of terminal technology, more and more terminals, such as mobile phones, tablet computers, computers, and the like, have been provided with image display functions. These terminals can display multiple images stored therein. In conventional technologies, when a terminal displays multiple stored images, the terminal generally displays them as thumbnails in a storing time order of the images. However, if some of the multiple images are similar to each other, or if some of them have poor qualities, the image display effect will be unsatisfactory. Therefore, there is a demand for a method for displaying images which has an improved display effect.

SUMMARY

In accordance with the present disclosure, there is provided a method for displaying images. The method includes clustering similar images in an album into a plurality of image groups when receiving an instruction for opening the album, selecting representative images from the image groups, and displaying the representative images.

Also in accordance with the present disclosure, there is provided a terminal including a processor and a memory storing instructions. The instructions, when executed by the processor, cause the processor to cluster similar images in an album into a plurality of image groups when receiving an instruction for opening the album, select representative images from the image groups, and display the representative images.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. The apparatuses and methods consistent with the present disclosure can be implemented, for example, in a terminal.

Figure 1:
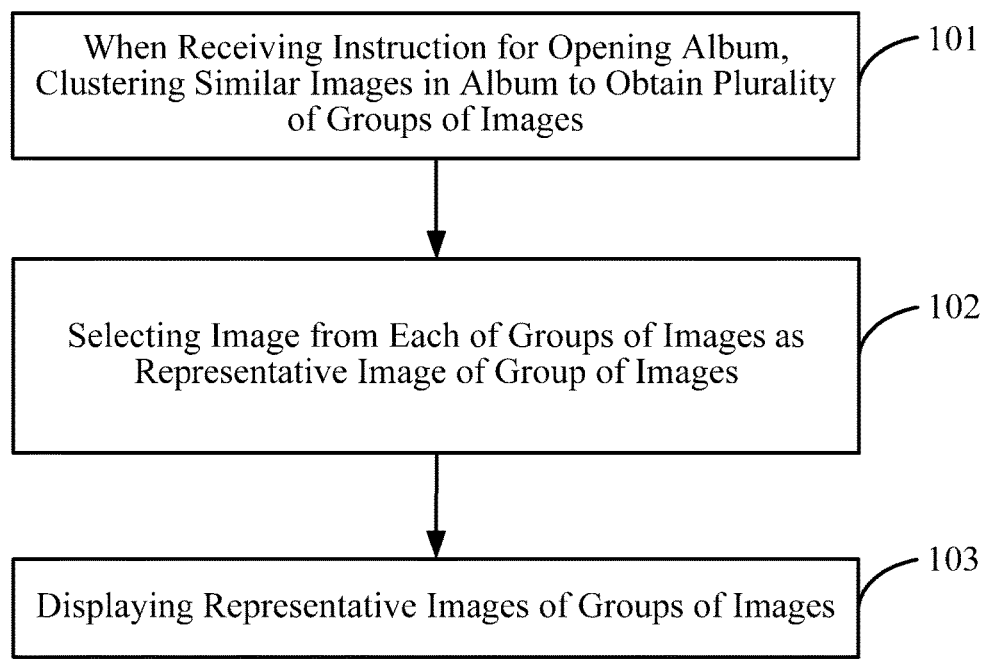
FIG. 1 is a flow chart illustrating a method for displaying images according to an exemplary embodiment.

FIG. 1 is a flow chart illustrating a method for displaying images according to an exemplary embodiment. As shown in FIG. 1, at 101, when an instruction for opening an album is received, similar images in the album are clustered to obtain a plurality of groups of images. At 102, an image is selected from each of the groups of images as a representative image of the group of images. At 103, the representative images of the groups of images are displayed. Hereinafter, such a group of similar images is also referred to herein as an "image group," and the representative image of an image group can be an image of the image group having a better image quality. In some embodiments, one or more representative images can be selected for an image group, and one of the one or more representative images may be displayed.

In some embodiments, a light quality parameter is used as a criterion to select a first set of images from an image group. The light quality parameter is a parameter measuring the quality of light, i.e., light quality, of an image, and a lower light quality parameter indicates a better light quality. In each image group, images having a light quality parameter less than a light threshold are selected, to obtain the first set of images. As such, images that are too dark or too bright will not be displayed, and thus the image display effect can be improved.

In some embodiments, a face angle is used as a criterion to select a second set of images from the first set of images. In the first set of images, images having a face angle within a designated angle range are selected, to obtain the second set of images. As such, images with an improper face posture will not be displayed. Rather, images meeting visual requirements of a user can be displayed, and thus the image display effect can be further improved.

In some embodiments, an eye feature is used as a criterion to select a third set of images from the second set of images. In the second set of images, images without closed eyes are selected, to obtain the third set of images. As such, images with closed eyes will not be displayed, and thus the image display effect can be further improved.

In some embodiments, a face clarity is used as a criterion to select representatives from the third set of images. In the third set of images, images having a face clarity larger than or equal to a designated clarity are selected, to obtain the representative images of the image group. As such, images with better face clarity are displayed, and thus the image display effect can be further improved.

In some embodiments, the light quality parameter of an image can be determined according to a gray scale of the image. Specifically, the image is transformed into a gray-scale image. A first number of pixels in the gray-scale image that have a gray scale less than a first gray-scale threshold and a second number of pixels in the gray-scale image that have a gray scale larger than a second gray-scale threshold are determined. Then a first ratio of the first number of pixels to a total number of pixels in the gray-scale image and a second ratio of the second number of pixels to the total number of pixels are determined. The light quality parameter of the image is determined based on the first ratio and the second ratio.

In some embodiments, the face angle of an image can be determined according to face feature points of the image. Specifically, a first feature point and a second feature point of the image are selected. The first feature point and the second feature point are feature points symmetrical with respect to a nose in a left-to-right direction. A first distance between the first feature point and a designated feature point and a second distance between the second feature point and the designated feature point are determined. The face angle of the image is then determined based on the first distance and the second distance.

In some embodiments, the face clarity of an image can be determined according to pixel values of the image. Specifically, a pixel value of each pixel point in a face region of the image is acquired. Based on the pixel values of the pixel points, a cumulative gradient value of the face region is determined, which is determined as the face clarity of the image.

In some embodiments, to display the representative images of the image groups, the representative images are rotated and aligned such that face directions in the representative images are the same, and sizes of the aligned representative images are adjusted such that the sizes of the face regions in the adjusted representative images are the same. In some embodiments, the adjusted representative images can be displayed in a designated dynamic manner.

In some embodiments, if there are more than one representative image for an image group, one or two representative images are selected randomly for displaying, to avoid the monotony caused by showing multiple similar representative image.

The above optional technical solutions can be combined in any manner to form optional embodiments of the present disclosure, description of which is omitted here.

Figure 2:
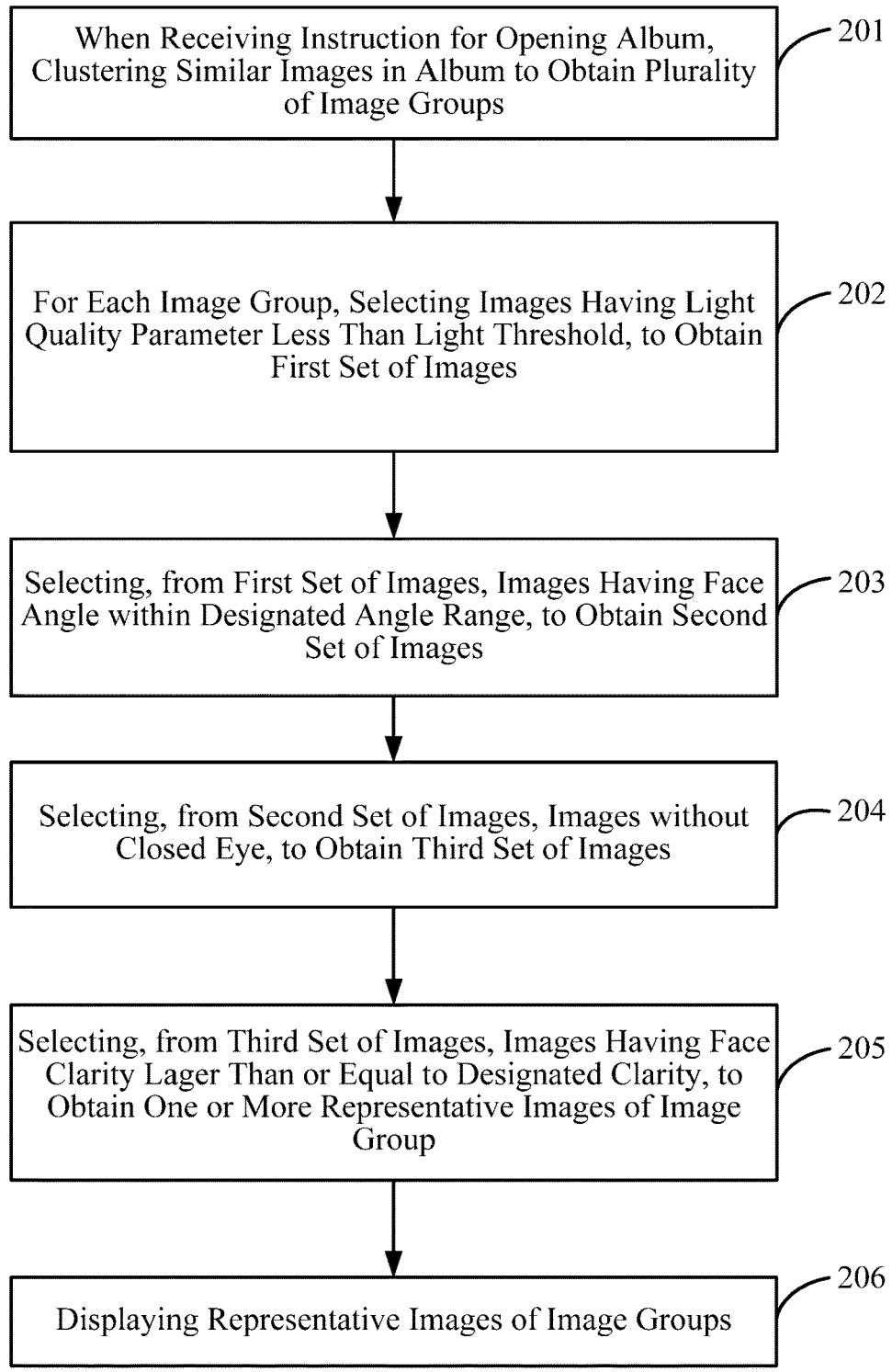
FIG. 2 is a flow chart illustrating a method for displaying images according to another exemplary embodiment.

FIG. 2 is a flow chart illustrating a method for displaying images according to another exemplary embodiment. As shown in FIG. 2, at 201, when an instruction for opening an album is received, similar images in the album are clustered to obtain a plurality of image groups. That is, the terminal gathers and groups similar or identical images, to obtain the plurality of image groups. The instruction for opening the album is configured to open the album, and can be triggered by a user. The user can trigger the instruction by a designated operation, such as a click operation, a slide operation, a voice operation, or the like, which is not limited by the present disclosure.

In some embodiments, the terminal can cluster the images in the album into the image groups through, for example, similarity clustering, detailed description of which is omitted.

At 202, for each image group, the terminal selects images having a light quality parameter less than a light threshold, to obtain a first set of images. By selecting images based on the light quality parameter, the terminal can exclude images that are too dark or too bright. In some embodiments, the light threshold can be set in advance, and is larger than 0 and less than 1. For example, the light threshold can be 0.8, 0.9, and so on, which is not limited by the present disclosure.

For example, assume an image group includes 5 images, referred to as Image 1, Image 2, Image 3, Image 4, and Image 5. Further assume, Image 1 has a light quality parameter of 0.26, Image 2 has a light quality parameter of 0.4, Image 3 has a light quality parameter of 0.7, Image 4 has a light quality parameter of 0.3, Image 5 has a light quality parameter of 0.9, and the light threshold is set to be 0.8. In this scenario, based on the light quality parameters of the images in the image group, the terminal selects Image 1, Image 2, Image 3, and Image 4, each of which has a light quality parameter less than the light threshold 0.8, to form the first set of images.

Further, to determine the light quality parameter of an image, in the image group, the terminal transforms the image into a gray-scale image. Based on the gray-scale image, the terminal determines a first number of pixels each having a gray scale less than a first gray-scale threshold and a second number of pixels each having a gray scale larger than a second gray-scale threshold. The terminal then determines a first ratio of the first number to a total number of pixels in the gray-scale image, and a second ratio of the second number to the total number. Based on the first and second ratios, the terminal determines the light quality parameter of the image. In some embodiments, the terminal can use at least one of the first ratio or the second ratio as the light quality parameter of the image. In some embodiments, the terminal can select the larger one of the first ratio and the second ratio, as the light quality parameter of the image. How the terminal selects the light quality parameter based on the first and second ratios is not limited by the present disclosure.

In some embodiments, the first gray-scale threshold and the second gray-scale threshold can be set in advance, and the second gray-scale threshold is larger than the first gray-scale threshold. For example, the first gray-scale threshold can be 30, and the second gray-scale threshold can be 200. The selection of the first and second gray-scale thresholds is not limited by the present disclosure.

For example, the terminal transforms the images in the image group into gray-scale images. For Image 1, the total number of pixels in the gray-scale image of Image 1 is 1000. Assume the first gray-scale threshold is 30 and the second gray-scale threshold is 200. The terminal determines that the number of pixels in the gray-scale image corresponding to Image 1 that have a gray scale smaller than the first gray-scale threshold of 30 is 150, i.e., the first number is 150. The terminal further determines that the number of pixels that have a gray scale larger than the second gray-scale threshold of 200 is 260, i.e., the second number is 260. Then, the terminal determines that the first ratio of the first number 150 to the total number 1000 is 0.15, and determines that the second ratio of the second number 260 to the total number is 0.26. If the larger one of the first and second ratios is selected as the light quality parameter, then since the first ratio is smaller than the second ratio, the terminal can determine the second ratio of 0.26 as the light quality parameter of Image 1.

At 203, images that have a face angle within a designated angle range are selected from the first set of images, to obtain a second set of images. That is, whether an image having a proper face posture is determined and the images having a proper face posture are selected.

For example, assume Image 1 has a face angle of 5 degrees, Image 2 has a face angle of 30 degrees, Image 3 has a face angle of 20 degrees, Image 4 has a face angle of 60 degrees, and the designated angle range is 0~45 degrees. Then, based on the face angles of the images in the first set of images, the terminal selects Image 1, Image 2, and Image 3, each of which has a face angle within the designated angle range of 0~45 degrees, from the first set of images, to obtain the second set of images.

In some embodiments, to determine the face angle of an image in the first set of images, the terminal acquires face feature points of the image, selects from the image a first feature point and a second feature point that are symmetrical to each other with respect to a nose in a left-to-right direction, determines a first distance between the first feature point and a designated feature point and a second distance between the second feature point and the designated feature point, and determines the face angle of the image based on the first distance and the second distance.

Figure 3:
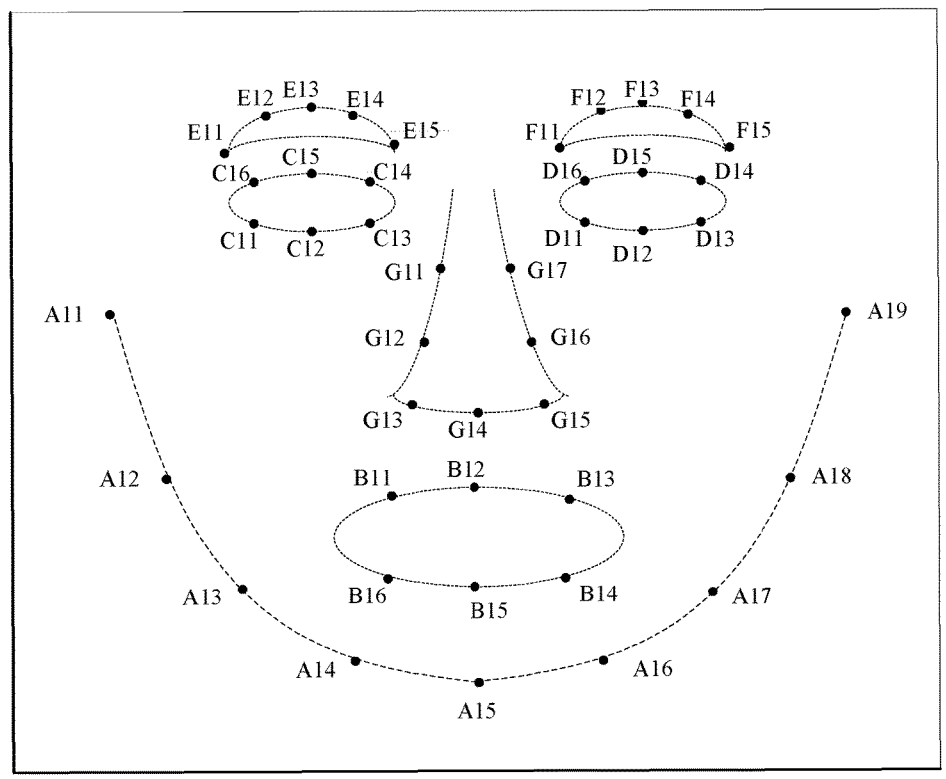
FIG. 3 is a schematic diagram illustrating distribution of face feature points in an image according to an exemplary embodiment.

The designated feature point can be located on a central line of the face with respect to the left-to-right direction, i.e., on a straight line where the nose is located. For example, FIG. 3 schematically shows face feature points in an image. In FIG. 3, the designated feature point can be, for example, a feature point G14 corresponding to the tip of the nose, one of feature points B12 and B15 corresponding to central positions of the lips, or a feature point A15 corresponding to a central position of the chin, and so on.

In the examples described above, one designated feature point is used to calculate the first and second distances. In some embodiments, two designated feature points are used, i.e., a first designated feature point and a second designated feature point, that are symmetrical to each other with respect to the nose in the left-to-right direction. In this scenario, assume the first feature point is to the left of the nose and the second feature point is to the right of the nose, then the first distance can be the distance between the first feature point and the first designated feature point, and the second distance can be the distance between the second feature point and the second designated feature point. For example, as shown in FIG. 3, the first designated feature point can be a feature point C12 corresponding to a central position of a lower half portion of the left eye and the second designated feature point can be a feature point D12 corresponding to a central position of a lower half portion of the right eye. As another example, the first designated feature point can be a feature point C15 corresponding to a central position of an upper half portion of the left eye and the second designated feature point can be a feature point D15 corresponding to a central position of an upper half portion of the right eye. The selection of designated feature point(s) is not limited by the present disclosure.

In some embodiments, to simplify calculation, the first feature point and the second feature point can be selected from points on the contour of the face. For example, as shown in FIG. 3, the first feature point can be a feature point A11, and the second feature point can be a feature point A19. The selection of the feature points is not limited by the present disclosure.

In some embodiments, to determine the face angle of the image based on the first distance and the second distance, the terminal can divide the first distance by the second distance, to obtain a third ratio, also referred to as a "face distance ratio." Based on the face distance ratio, the terminal can acquire a corresponding face angle from stored corresponding relationships between face distance ratios and face angles, and determine the acquired face angle as the face angle of the image.

For example, assume one designated feature point, e.g., the feature point G14 corresponding to the tip of the nose, is used. The terminal acquires face feature points in Image 1 from the first set of images, as shown in FIG. 3. From the feature points of Image 1 shown in FIG. 3, the terminal selects the feature point A11 on the contour of the left face as the first feature point and selects the feature point A19 on the contour of the right face as the second feature. The first feature point A11 and the second feature point A19 are symmetrical with respect to the nose in the left-to-right direction. The terminal determines that the first distance between the first feature point A11 and the designated feature point G14 is 36 mm, and determines that the second distance between the second feature point A19 and the designated feature point G14 is 40 mm. Then, the terminal divides the first distance 36 mm by the second distance 40 mm, to obtain the face distance ratio of 0.9. Based on the face distance ratio of 0.9, the terminal acquires the corresponding face angle, which is 5 degrees, from the corresponding relationships between ratios and face angles shown in Table 1 below. The terminal determines the acquired face angle of 5 degrees as the face angle of the image.

TABLE 1

| Face Distance Ratio | Face Angle |
|---|---|
| 0.9 | 5 degrees |
| 0.8 | 10 degrees |
| 0.7 | 20 degrees |
| . . . | . . . |

Table 1 is an example for illustrating the corresponding relationships between face distance ratios and face angles, and does not limit the present disclosure.

In some embodiments, the terminal can acquire face features of an image through an algorithm such as Sparse Deforming Model (SDM), Active Shape Model (ASM), Active Appearance Model (AAM), or the like. Detailed description of the algorithms is omitted here.

At 204, images without a closed eye are selected from the second set of images, to obtain a third set of images. Whether an image has a closed eye can be determined based on an eye feature of the image.

Specifically, to determine whether an image has a closed eye, the terminal acquires eye feature points of the image, and determines a classification result of the eye feature points through a designated classifier. When the classification result is a first value, the terminal determines that the image has a closed eye. When the classification result is a second value, the terminal determines that the image does not have a closed eye. In some embodiments, the first value and the second value can be set in advance, and the first value is different from the second value. For example, the first value can be 1, and the second value can be 0, and so on. The selection of the first and second values is not limited by the present disclosure.

For example, assume the first value is 1 and the second value is 0. The terminal acquires eye feature points in Image 1, Image 2, and Image 3 in the second set of images. Based on all of the eye features in Image 1 and through the designated classifier, the terminal determines that the classification result of Image 1 is 0, and thus determines that Image 1 is an image without closed eye. Based on all of the eye features in Image 2 and through the designated classifier, the terminal determines that the classification result of Image 2 is 1, and thus determines that Image 2 is an image having a closed eye. Based on all of the eye features in Image 3 and through the designated classifier, the terminal determines that the classification result of Image 3 is 0, and thus determines that Image 3 is an image without closed eye. In this case, the terminal selects Image 1 and Image 3 from the second set of images as the images that do not have a closed eye, to obtain the third set of images.

At 205, images having a face clarity larger than or equal to a designated clarity are selected from the third set of images, to obtain one or more representative images of the image group. The designated clarity is used to determine whether a face in an image is clear, and can be set in advance. For example, the designated clarity can be 180, 200, and so on, which is not limited by the present disclosure.

For example, assume the face clarity of Image 1 is 80, the face clarity of Image 3 is 200, and the designated clarity is 180. Thus, the terminal selects from the third set of images, Image 3 as the image which has a face clarity larger than or equal to the designated clarity 180, to obtain Image 3 as the representative image of the group of images.

In some embodiments, to determine the face clarity of an image, the terminal acquires a pixel value of each pixel point contained in a face region of the image, determines a cumulative gradient value of the face region based on the pixel values of the pixel points in the face region, and determines the cumulative gradient value as the face clarity of the image. The face region can be determined by using, for example, face recognition, detailed description of which is omitted here.

In some embodiments, to determine the cumulative gradient value of the face region, the terminal calculates a difference value between each pair of adjacent pixels along a horizontal direction in the face region to obtain difference values of the pixels along the horizontal direction, and determines a sum of the difference values of the pixels along the horizontal direction as a first gradient value. Similarly, the terminal calculates a difference value between each pair of adjacent pixels along a vertical direction in the face region to obtain difference values of the pixels along the vertical direction, and determines a sum of the difference values of the pixels along the vertical direction as a second gradient value. The terminal then determines a sum of the first gradient value and the second gradient value as the cumulative gradient value of the face region.

According to the present disclosure, the terminal can execute any one of or any combination of the above-described processes 202-205 to determine the one or more representative images. The selection of a particular process or combination is not limited by the present disclosure.

Further, in addition to or instead of the light quality parameter, face angle, eye feature, and face clarity mentioned, the terminal can also select the representative images according to other parameters, such as resolution, contrast ratio, and color saturation of the images, which is not limited by the present disclosure.

At 206, the representative images of the image groups are displayed. In some embodiments, the terminal rotates and aligns the representative images of the image groups such that face directions of the representative images are the same. For example, the terminal can rotate the representative images leftward, rightward, horizontally, or vertically, or about any rotation axis, which is not limited by the present disclosure.

In some embodiments, the terminal further adjusts sizes of the aligned representative images such that the sizes of face regions of the adjusted representative images are the same. For example, the terminal can zoom in representative images with a face region smaller than a designated size and zoom out representative images with a face region larger than the designated size, such that sizes of face regions in the adjusted representative images are the same. The designated size can be set in advance, and can be set based on the size of the screen of the terminal or based on any one of the representative images. For example, assume the terminal has a screen size of 4.5 inches, then the designated size can be set to be 2.5 inches, 3 inches, and so on, which is not limited by the present disclosure.

In some embodiments, the terminal then displays the adjusted representative images in a designated dynamic manner. Further, the terminal can display the representative images in a designated dynamic manner randomly or according to storing times of the images. As such, a user-centric time dynamic album corresponding to the representative images can be created, which is impressive and attractive. The designated dynamic displaying manner can be, for example, in the form of slides or in another form, which is not limited by the present disclosure.

Further, when there are more than one representative image for an image group, the terminal can randomly select one or two representative images from the representative images for displaying, to avoid displaying all of the similar representative images.

Still further, when the terminal receives an instruction for opening an album and opens the album to display images, the terminal can present multiple options of browsing manners for the user to select one as the dynamic displaying manner. When the terminal receives an instruction for displaying dynamic images through one of the multiple browsing manners, the terminal can display the images in the album with the designated dynamic manner according to, for example, the method described above with reference to FIG. 2. Alternatively, the terminal can also set the above-described method for displaying images as a default displaying manner, and when the album is opened next time, the terminal can automatically display the images with the designated dynamic displaying manner, to improve the image displaying effect and make it impressive and attractive. While the terminal is displaying the images in the album with the designated dynamic displaying manner, or after the terminal completes the display of the images in the album, the terminal can quit the mode of displaying representative images of the album upon receiving an instruction for quitting displaying.

In some embodiments, when the terminal displays the multiple options of browsing manners, the terminal can directly display the multiple options of browsing manners upon receiving the instruction for opening the album, for the user to select from the multiple options of browsing manners. Alternatively, the terminal can also present a designated button, and when the user clicks the designated button, the terminal can display a drop-down menu containing the multiple options of browsing manners, for the user to select therefrom. As such, the user would not be unnecessarily bothered when the user does not want to select a browsing manner.

According to the present disclosure, the instruction for displaying dynamic images is configured to display the images in the album with a dynamic manner, and can be triggered by the user by, for example, clicking a designated button, which is not limited by the present disclosure. In addition, the instruction for quitting displaying is configured to quit displaying representative images, and can be triggered by the user through an operation such as click, slide, swipe, or the like, which is not limited by the present disclosure.

In some embodiments, the terminal can cluster the images in the album and obtain the representative images before receiving the instruction for opening the album. Then, when the terminal receives the instruction for opening the album, the terminal can display the representative images directly. This saves time for displaying images and improves the efficiency in displaying images.

In some embodiments, the terminal can select a dynamic image displaying template from a library of dynamic image displaying templates and fill the representative images into the dynamic image displaying template to form an album of dynamic images, before receiving the instruction for opening the album. Then, when the terminal receives the instruction for opening the album, the terminal can directly display the album of dynamic images. This improves the image displaying effect, and makes it impressive and attractive. The library of dynamic image displaying templates can be stored in the terminal in advance, or can be acquired from a server, which is not limited by the present disclosure.

Further, since the images in the album may be updated from time to time, that is, the user may delete/add images from/to the album, in some embodiments, the terminal can periodically cluster the images and select representative images, so as to update the representative images and improve the accuracy in image display. In some embodiments, the terminal can update the selected representative images of the album with a designated period such as 1 week, 2 weeks, 1 month, and so on. Alternatively, the terminal can set to update the album when a designated number of images have been updated, such as 10, 20, and so on. The manner of updating the representative images is not limited by the present disclosure.

Figure 4:
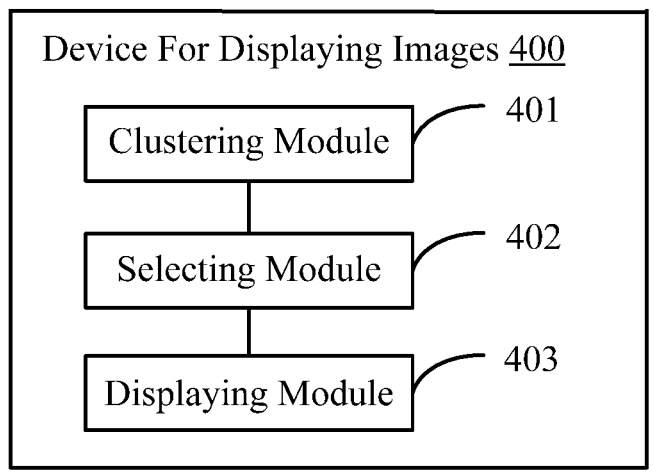
FIG. 4 is a block diagram of a device for displaying images according to an exemplary embodiment.

FIG. 4 is a block diagram of a device 400 for displaying images according to an exemplary embodiment. As shown in FIG. 4, the device 400 includes a clustering module 401, a selecting module 402, and a displaying module 403. The clustering module 401 is configured to, when an instruction for opening an album is received, cluster similar images in an album to obtain a plurality of image groups. The selecting module 402 is configured to select an image from each of the image groups as a representative image of the image group. The displaying module 403 is configured to display the representative images of the image groups.

Figure 5:
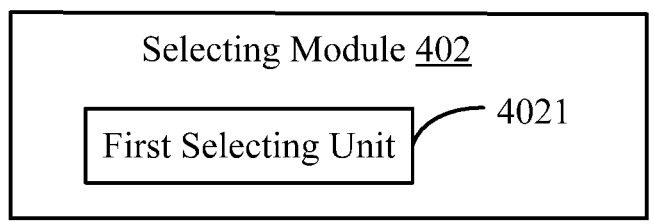
FIG. 5 is a block diagram of an example of a selecting module shown in FIG. 4.

In some embodiments, as shown in FIG. 5, the selecting module 402 includes a first selecting unit 4021 configured to, for each of the image groups, select images having a light quality parameter less than a light threshold, to obtain a first set of images.

Figure 6:
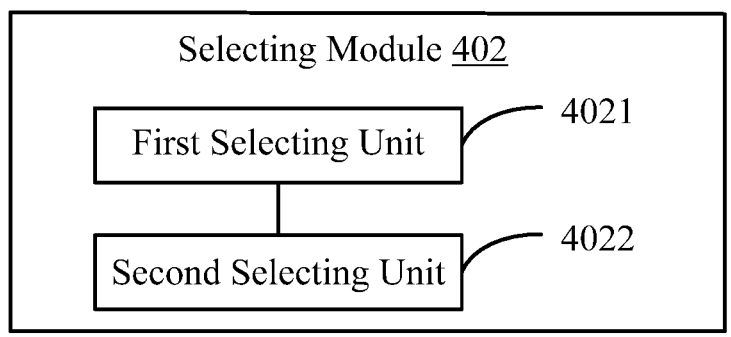
FIG. 6 is a block diagram of another example of the selecting module.

In some embodiments, as shown in FIG. 6, the selecting module 402 further includes a second selecting unit 4022 configured to select, from the first set of images, images having a face angle within a designated angle range, to obtain a second set of images.

Figure 7:
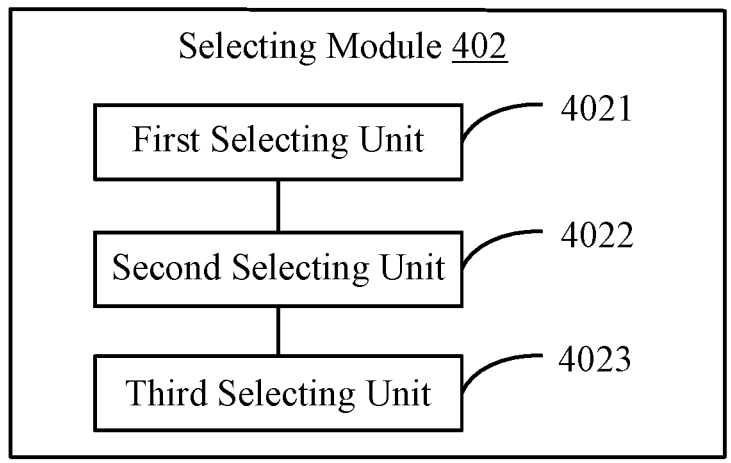
FIG. 7 is a block diagram of another example of the selecting module.

In some embodiments, as shown in FIG. 7, the selecting module 402 further includes a third selecting unit 4023 configured to select, from the second set of images, images without a closed eye, to obtain a third set of images.

Figure 8:
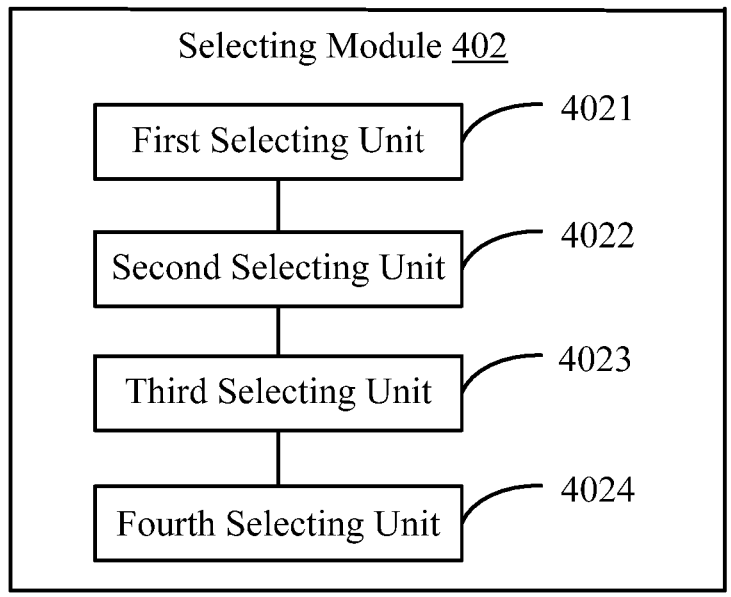
FIG. 8 is a block diagram of another example of the selecting module.

In some embodiments, as shown in FIG. 8, the selecting module 402 further includes a fourth selecting unit 4024 configured to select, from the third set of images, images having a face clarity larger than or equal to a designated clarity, to obtain one or more representative images of the group of images.

Figure 9:
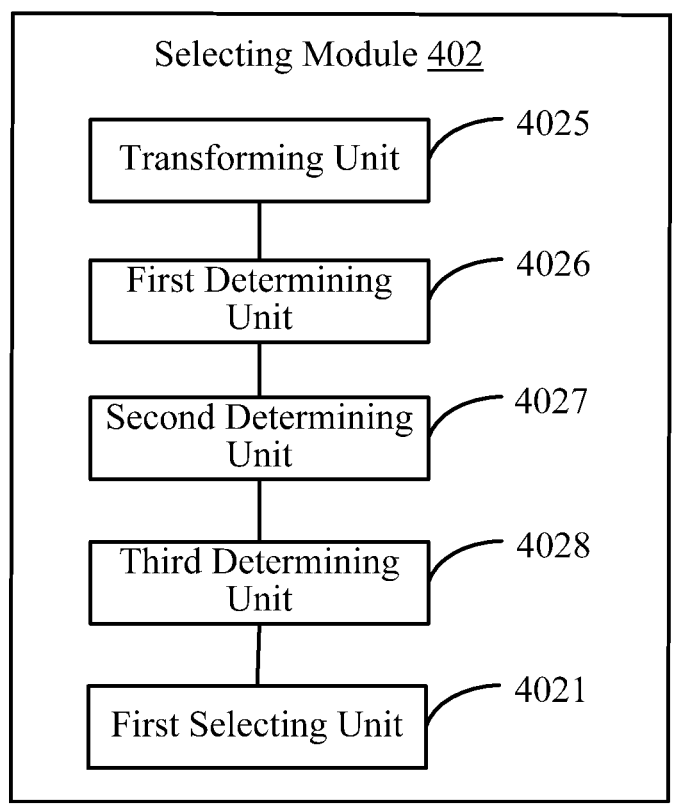
FIG. 9 is a block diagram of another example of the selecting module.

FIG. 9 shows another example of the selecting module 402, which is similar to the example of the selecting module 402 shown in FIG. 5 but further includes a transforming unit 4025, a first determining unit 4026, a second determining unit 4027, and a third determining unit 4028. The transforming unit 4025 is configured to transform an image into a gray-scale image. The first determining unit 4026 is configured to, based on the gray-scale image, determine a first number of pixels each having a gray scale less than a first gray-scale threshold and a second number of pixels each having a gray scale larger than a second gray-scale threshold. The second determining unit 4027 is configured to determine a first ratio of the first number to a total number of pixels in the gray-scale image, and a second ratio of the second number to the total number. The third determining unit 4028 is configured to determine the light quality parameter of the image based on the first ratio and the second ratio.

Figure 10:
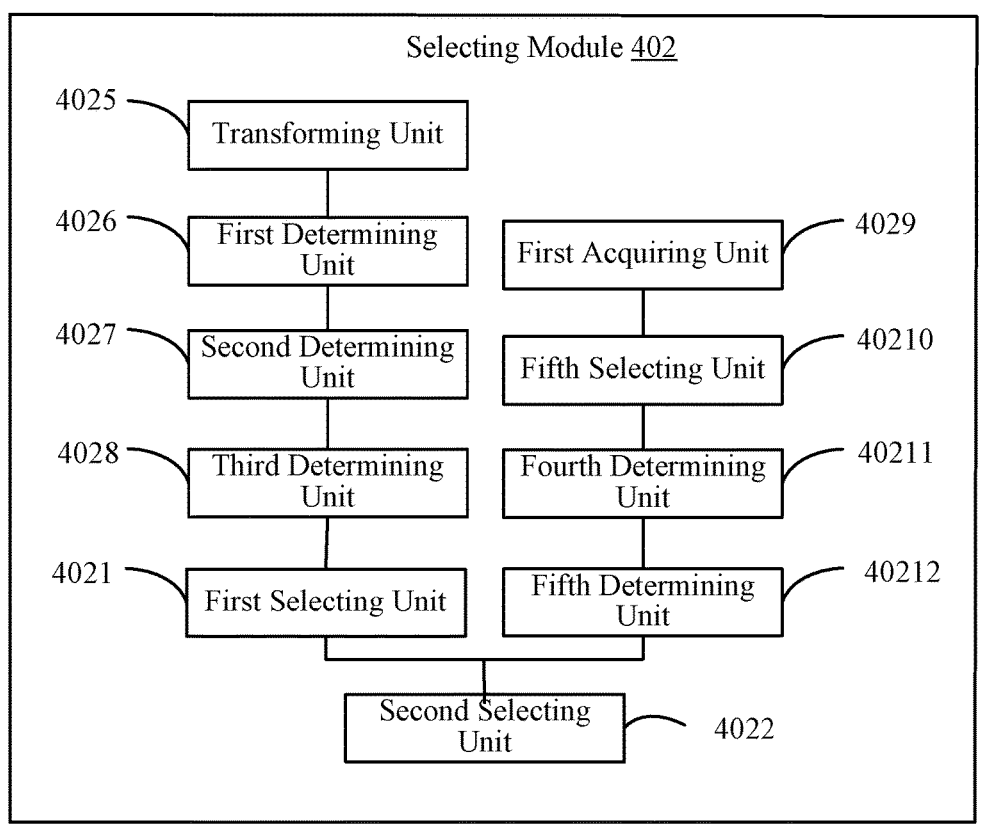
FIG. 10 is a block diagram of another example of the selecting module.

FIG. 10 shows another example of the selecting module 402, which is similar to the example of the selecting module 402 shown in FIG. 9, but further includes the second selecting unit 4022, a first acquiring unit 4029, a fifth selecting unit 40210, a fourth determining unit 40211, and a fifth determining unit 40212. The first acquiring unit 4029 is configured to acquire face feature points of the image. The fifth selecting unit 40210 is configured to select from the image a first feature point and a second feature point symmetrical to each other with respect to a nose in a left-to-right direction. The fourth determining unit 40211 is configured to determine a first distance between the first feature point and a designated feature point and a second distance between the second feature point and the designated feature point. The fifth determining unit 40212 is configured to determine the face angle of the image based on the first distance and the second distance.

Figure 11:
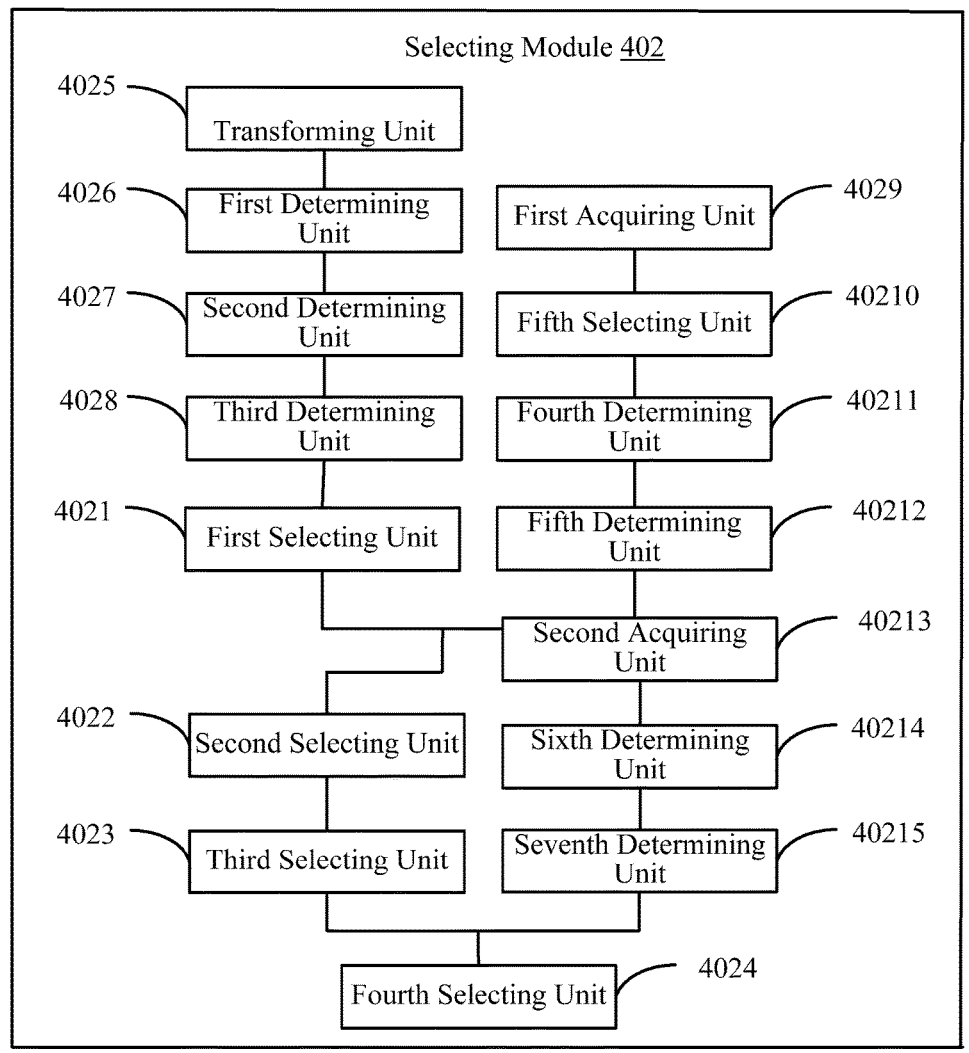
FIG. 11 is a block diagram of another example of the selecting module.

FIG. 11 shows another example of the selecting module 402, which is similar to the example of the selecting module 402 shown in FIG. 10, but further includes the third selecting unit 4023, the fourth selecting unit 4024, a second acquiring unit 40213, a sixth determining unit 40214, and a seventh determining unit 40215. The second acquiring unit 40213 is configured to acquire a pixel value of each pixel point contained in a face region of the image. The sixth determining unit 40214 is configured to determine a cumulative gradient value of the face region based on the pixel values of the pixel points in the face region. The seventh determining unit 40215 is configured to determine the cumulative gradient value as the face clarity of the image.

Figure 12:
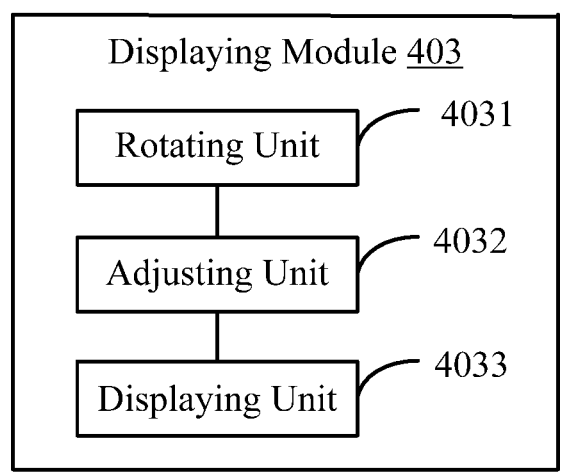
FIG. 12 is a block diagram of an example of a displaying module shown in FIG. 4.

In some embodiments, as shown in FIG. 12, the displaying module 403 includes a rotating unit 4031, an adjusting unit 4032, and a displaying unit 4033. The rotating unit 4031 is configured to rotate and align the representative images of the image groups such that face directions of the representative images are the same. The adjusting unit 4032 is configured to adjust sizes of the aligned representative images such that the sizes of face regions of the adjusted representative images are the same. The displaying unit 4033 is configured to display the adjusted representative images in a designated dynamic manner.

In some embodiments, when there are more than one representative image for an image group, one or two representative images are selected randomly for displaying.

Operations of the above-described exemplary devices are similar to the above-described exemplary methods, and thus their detailed description is omitted here.

Figure 13:
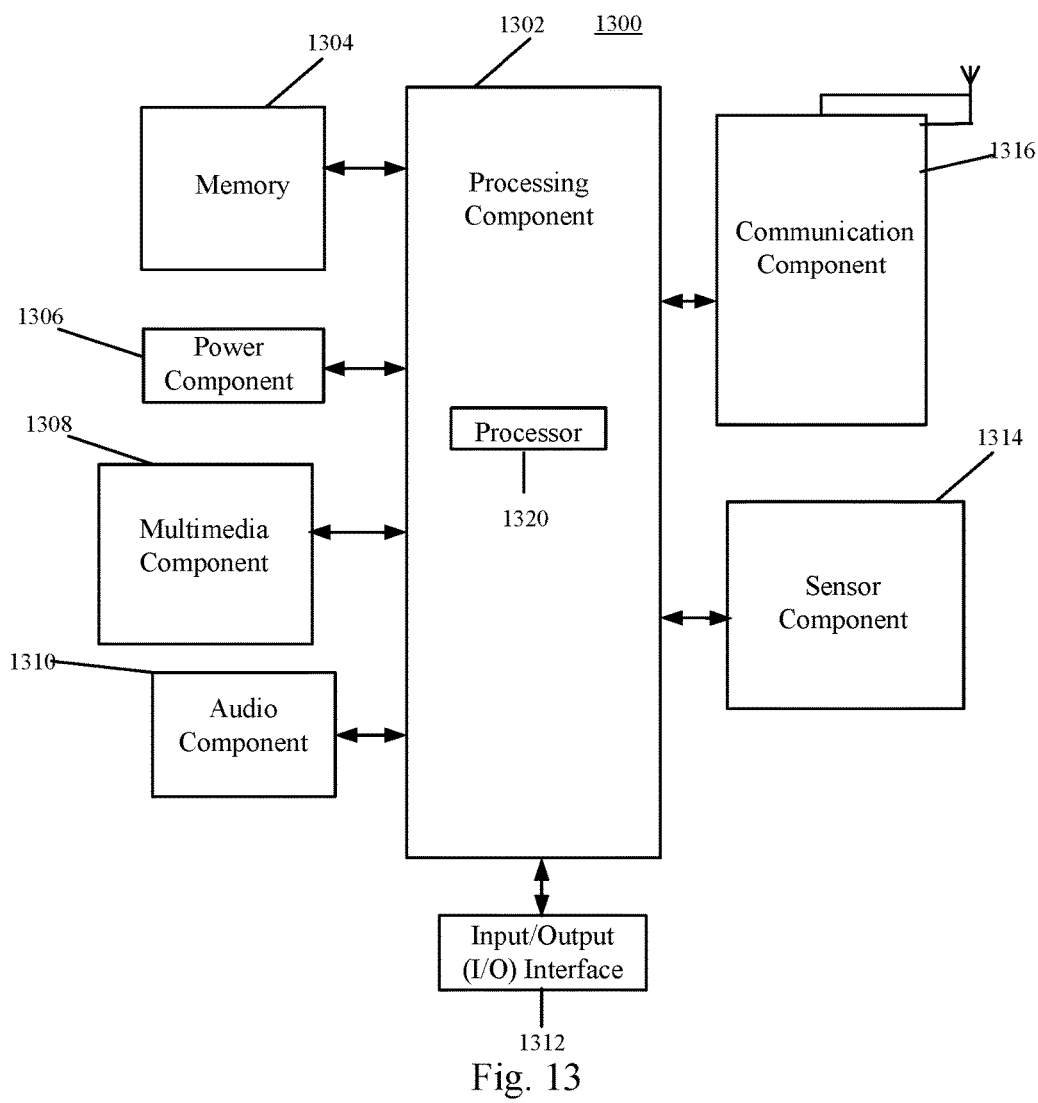
FIG. 13 is a block diagram of a device for displaying images according to another exemplary embodiment.

FIG. 13 is a block diagram of a device 1300 for displaying images according to another exemplary embodiment. For example, the device 1300 may be a mobile phone, a computer, a digital broadcast terminal, a messaging device, a gaming console, a tablet, a medical device, exercise equipment, a personal digital assistant, or the like.

Referring to FIG. 13, the device 1300 includes one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of a method consistent with the present disclosure, such as one of the above-described exemplary methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, 3G, or 4G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium including instructions, such as included in the memory 1304, executable by the processor 1320 in the device 1300, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, one or two representative images with a better image quality in an image group, such as an image with a better light quality, with a better face posture, with opened eyes, and/or with a better face clarity, are displayed instead of all images in the image group. Therefore, image display effect can be improved.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A processor-implemented method for displaying images on a terminal, comprising:
   clustering, when receiving an instruction for opening an album, similar images in the album into a plurality of image groups;
   selecting representative images from the image groups; and
   displaying the representative images,
   wherein selecting the representative images includes:
   for each image in each image group:
      (i) transforming the image into a gray-scale image;
      (ii) determining a first number of pixels each having a gray scale less than a first gray-scale threshold and a second number of pixels each having a gray scale larger than a second gray-scale threshold;
      (iii) determining a first ratio of the first number to a total number of pixels in the gray-scale image, and a second ratio of the second number to the total number; and
      (iv) determining the light quality parameter of the image based on the first ratio and the second ratio; and
   for each image group, selecting one or more images having a light quality parameter less than a light threshold, to obtain an image set.

2. The method of claim 1, wherein:
   the image set is a first image set, and
   selecting the representative images further includes, for each image group:
      selecting, from the first image set, one or more images having a face angle within a designated angle range, to obtain a second image set.

3. The method of claim 2, further comprising, before selecting the one or more images to obtain the second image set, for each image in the first image set of each image group:
   acquiring face feature points of the image;
   selecting from the image a first feature point and a second feature point symmetrical to each other with respect to a nose in a left-to-right direction;
   determining a first distance between the first feature point and a designated feature point and a second distance between the second feature point and the designated feature point; and
   determining the face angle of the image based on the first distance and the second distance.

4. The method of claim 2, wherein selecting the representative images further includes, for each image group:
   selecting, from the second image set, one or more images without a closed eye, to obtain a third image set.

5. The method of claim 4, wherein selecting the representative images further includes, for each image group:
   selecting, from the third image set, one or more images having a face clarity larger than or equal to a designated clarity, to obtain one or more representative images of the image group.

6. The method of claim 5, further comprising, before selecting the one or more images to obtain the one or more representative images, for each image in the third image set of each image group:
   acquiring a pixel value of each pixel point contained in a face region of the image;
   determining, based on the pixel value of each pixel point, a cumulative gradient value of the face region; and
   determining the cumulative gradient value as the face clarity of the image.

7. The method of claim 1, wherein displaying the representative images includes:
   rotating and aligning the representative images such that face directions of the representative images are the same;
   adjusting sizes of the aligned representative images such that sizes of face regions of the adjusted representative images are the same; and
   displaying the adjusted representative images in a designated dynamic manner.

8. The method of claim 7, wherein displaying the representative images further includes:
   randomly selecting, when there are two or more representative images for one of the image groups, one or two representative images from the two or more representative images for displaying.

9. A terminal, comprising:
   a processor; and
   a memory storing instructions that, when executed by the processor, cause the processor to:
      cluster, when receiving an instruction for opening an album, similar images in the album into a plurality of image groups;
      select representative images from the image groups; and
      display the representative images,
   wherein in selecting the representative images from the image groups, the instructions further cause the processor to:
      for each image in each image group:
         (i) transform the image into a gray-scale image;
         (ii) determine a first number of pixels each having a gray scale less than a first gray-scale threshold and a second number of pixels each having a gray scale larger than a second gray-scale threshold;

(iii) determine a first ratio of the first number to a total number of pixels in the gray-scale image, and a second ratio of the second number to the total number; and
(iv) determine the light quality parameter of the image based on the first ratio and the second ratio; and for each image group, select one or more images having a light quality parameter less than a light threshold, to obtain an image set.

10. The terminal of claim 9, wherein:
the image set is a first image set, and
the instructions further cause the processor to, for each image group:
   select, from the first image set, one or more images having a face angle within a designated angle range, to obtain a second image set.

11. The terminal of claim 10, wherein the instructions further cause the processor to, before selecting the one or more images to obtain the second image set, for each image in the first image set of each image group:
   acquire face feature points of the image;
   select from the image a first feature point and a second feature point symmetrical to each other with respect to a nose in a left-to-right direction;
   determine a first distance between the first feature point and a designated feature point and a second distance between the second feature point and the designated feature point; and
   determine the face angle of the image based on the first distance and the second distance.

12. The terminal of claim 10, wherein the instructions further cause the processor to, for each image group:
   select, from the second image set, one or more images without a closed eye, to obtain a third image set.

13. The terminal of claim 12, wherein the instructions further cause the processor to, for each image group:
   select, from the third image set, one or more images having a face clarity larger than or equal to a designated clarity, to obtain one or more representative images of the image group.

14. The terminal of claim 13, wherein the instructions further cause the processor to, before selecting the one or more images to obtain the one or more representative images, for each image in the third image set of each image group:
   acquire a pixel value of each pixel point contained in a face region of the image;
   determine, based on the pixel value of each pixel point, a cumulative gradient value of the face region; and
   determine the cumulative gradient value as the face clarity of the image.

15. The terminal of claim 9, wherein the instructions further cause the processor to:
   rotate and align the representative images such that face directions of the representative images are the same;
   adjust sizes of the aligned representative images such that sizes of face regions of the adjusted representative images are the same; and
   display the adjusted representative images in a designated dynamic manner.

16. The terminal of claim 9, wherein the instructions further cause the processor to:
   randomly select, when there are two or more representative images for one of the image groups, one or two representative images from the two or more representative images for displaying.

\* \* \* \* \*